United States Patent [19]

Murphy et al.

[11] 4,343,116

[45] Aug. 10, 1982

[54] PROCESSES FOR FINISHING GLASS SURFACES

[75] Inventors: Norman A. Murphy, Liverpool; John G. Banner, Wirral; Edwin Fletcher, Ormskirk, all of England; Arthur Brown, Clwyd, Wales

[73] Assignee: Pilkington Brothers Limited, St. Helens, England

[21] Appl. No.: 169,217

[22] Filed: Jul. 15, 1980

[30] Foreign Application Priority Data

Jul. 26, 1979 [GB] United Kingdom ................ 7926032

[51] Int. Cl.$^3$ .......................... B24B 1/00; B24B 13/00
[52] U.S. Cl. ............................... 51/284 R; 51/283 R; 51/323; 51/318; 134/2; 134/27
[58] Field of Search ..................... 51/283 R, 283, 284, 51/284 E, 317, 323, 318; 264/220; 134/2, 3, 26, 27, 29; 65/61

[56] References Cited

U.S. PATENT DOCUMENTS

| | | | |
|---|---|---|---|
| 2,658,317 | 11/1953 | Morgan | 51/283 |
| 3,236,010 | 2/1966 | Evans et al. | 51/283 R |
| 3,310,495 | 3/1967 | Masuda et al. | 51/283 |
| 3,388,508 | 6/1968 | Sieger et al. | 51/284 |
| 3,948,007 | 4/1976 | Feneberg et al. | 51/284 |

FOREIGN PATENT DOCUMENTS 747738  4/1956  United Kingdom ................ 264/220

*Primary Examiner*—Stephen G. Kunin
*Assistant Examiner*—Robert A. Rose
*Attorney, Agent, or Firm*—Burns, Doane, Swecker & Mathis

[57] ABSTRACT

A method of finishing a glass surface to a close tolerance and a substantially blemish-free state using a moving polishing lap and an aqueous treatment liquid containing inert abrasive particles, in which the treatment liquid also contains a bifluoride which reacts with the glass to form an insoluble silicofluoride or fluoride, an acid supplying hydrogen ions and a solubility suppressant which ensures that the silicofluoride or fluoride separates out on the glass surface, whereby the lap and inert particles remove the silicofluoride or fluoride from high portions of the glass surface and thereby allow further reaction and glass removal in those areas until the desired finished form of the glass surface has been achieved, whereupon the supply of treatment liquid is stopped and immediately replaced by a supply of an alkaline neutralizing solution, e.g., of sodium carbonate, containing inert particles and the surface is finally washed to remove the alkaline solution and any remaining neutralized treatment liquid.

9 Claims, No Drawings

PROCESSES FOR FINISHING GLASS SURFACES

BACKGROUND OF THE INVENTION

1. Field of the Invention

This invention relates to processes for finishing glass surfaces, and more particularly for the finishing of the surfaces of glass articles to close tolerances and a brilliant blemish-free state.

2. Description of the Prior Art

The shaping and finishing of glass articles to close tolerances are conventionally carried out by the operations referred to as grinding or diamond machining and subsequent polishing. The term "grinding" conventionally refers to the shaping of the glass surface by abrasives to a desired contour and polishing refers to the application of the finish to the surface. Polishing is usually effected mechanically, using a shaped tool known as a polishing lap, which is normally rotated and works on the glass surface through the intermediary of inert fine solid particles suspended in a liquid supplied to the lap or to the glass surface so as to prevent direct contact between the lap and the glass surface. Grinding and mechanical polishing are the operations which are conventionally used in converting glass articles into lenses for optical and opthalmic purposes with a particular precise contour and polished finish.

The use of chemical attack as a means of polishing and cleaning the surfaces of glass articles is well known and is used for example in the finishing of lead crystal glass which has been cut to provide a decorative surface on the glass. The possibility of using chemical attack as a means of surfacing a continuous ribbon of glass, or of surfacing a face of a sheet of glass, has been disclosed and described in U.K. Patent Specifications Nos. 747,738, 747,759 and 892,607 in the name of Pittsburgh Plate Glass Company. These specifications describe the use of a chemical solution to attack the glass surface, the solution consisting of a solvent, an acid capable of supplying hydrogen ions when dissolved in said solvent, a fluoride soluble in said solution, said fluoride having a cation from the group of organic and inorganic radicals capable of forming a silicofluoride or a fluoride that is highly insoluble in the solvent, and a suppressant to further increase the insolubility of the silicofluoride or fluoride in said solvent in order to control the size of the particles formed at the surface. The solution reacts with the glass surface and a masking film is formed which prevents further reaction with the glass surface until the film is removed. The reaction products are continuously removed mechanically by abrasion with a polishing lap so as to re-expose the high portions of the glass surface to attack until a desired shape is obtained. The surface is then flooded with water. The processes disclosed and described as surfacing in the above U.K. patent specifications, however, relate to carrying out a uniform polishing action on a flat surface in which the amount of glass removed is kept to a minimum.

It is over twenty years since the publication of U.K. Specifications 747,738 and 747,759 and we are unaware of any large scale application of the techniques described, either to the finishing of flat glass or to that of any other articles.

SUMMARY OF THE INVENTION

We have now found that certain solutions of the kind disclosed in particular in the Table in Example II of U.K. Specifications 747,738 and 747,759 can be of value in the finishing of glass articles such as lens blanks to a precise final form. As mentioned above, optical quality glass lenses for spectacles or optical instruments are produced at present by grinding or diamond machining a surface to a desired shape and subsequently mechanically polishing the surface thus generated. It is in the final production of the polished surface that we have found solutions of the kind disclosed in U.K. Patent Specifications 747,738 and 747,759 to be of particular value. As disclosed in the prior art, we have found that the removal of glass can be carried out satisfactorily by contacting the glass surface with solutions of the kind disclosed, and removing mechanically the material which separates out on the glass surface. The method described in U.K. Specifications 747,738 and 747,759 has not, however, proved satisfactory for finishing glass surfaces to a blemish-free state. We have found that the surfaces treated by the described method suffer from defects which require a further polishing operation to remove them. Our investigations indicate that these defects are formed on the glass surface at the completion of the shaping and finishing operation, when the supply of solution is replaced by a supply of water to remove the solution from the glass surface. We believe that these defects are due to the production of hydrofluoric acid as the solution on the article is diluted with water, or as the solution being fed is diluted. We have found that the production of such defects can be avoided, however, if the article is flooded with an alkaline solution so that neutralisation takes place very rapidly.

According to the invention, therefore, there is provided a method of finishing a surface of a glass article to a close tolerance and a substantially blemish-free state, comprising the steps of causing a polishing lap to act on the surface by relative movement while continuously supplying to the surface a treatment liquid comprising water, inert particles which exert an abrasive action while preventing direct contact between the polishing lap and the glass surface, a bifluoride which forms an at least partially insoluble silicofluoride or fluoride by reaction with the glass surface, an acid which supplies hydrogen ions in solution in the water, and a solubility suppressant which maintains the treatment liquid in such a state that the silicofluoride or fluoride separates out and continues to separate out on the glass surface, whereby the lap and inert particles remove the silicofluoride or fluoride from high portions of the surface and thereby allow further reaction and glass removal in those areas, continuing the relative movement of the polishing lap and the supply of treatment liquid until a desired finished form of the glass surface has been achieved, the continuing the relative movement of the polishing lap while stopping the supply of treatment liquid and replacing it immediately by a supply of an alkaline solution which neutralises any treatment liquid remaining on the glass surface or on the lap and which contains inert particles which continue the prevention of direct contact between the polishing lap and the glass surface, and finally washing the surface to remove the alkaline solution and any remaining neutralised treatment liquid.

The invention enables one to effect rapid finishing of glass articles such as ophthalmic lenses, optical glass elements such as flats and prisms, and the like, from a ground, partially finished state to a form having a surface with a precise contour and a brilliant blemish-free finish.

The method of the invention is applicable to articles made of those glasses whose composition is such that in the presence of a bifluoride, an insoluble silicofluoride or fluoride is produced by interaction with the glass at the surface. A series of glasses has been investigated and examples are given below of the detailed treatment of a number of glasses chosen from the available ranges.

Optical and ophthalmic glasses are classified and given names according to their composition, density and refractive index and a particular name such as Dense Flint does not apply to only one composition but to a range of compositions having the characteristics required of a Dense Flint, i.e. a glass having a higher refractive index and greater dispersive power than a Crown glass. Such a classification was proposed by G. W. Morey and is illustrated in "The Properties of Glass" by G. W. Morey, ACS Monograph 124, Reinhold Publishing Company, 1954, at page 422. Each manufacturer will have his own specific composition with slight differences in refractive index and dispersion, and possibly density. The following glass types are used in the examples below:

Dense Flint
Extra Dense Flint
Double Extra Dense Flint
Hard Crown
Medium Barium Crown
Dense Barium Crown
Ophthalmic White Glass
Aluminophosphate Photochromic Glass
Heavy Lead Radiation Protection Glass This is not intended to be an exhaustive list of glass types to which the invention is applicable.

The polishing lap should be designed to ensure substantially uniform distribution of the liquid over the surface of the article in contact with the lap. This can be achieved by providing grooves or passages in the surface of the lap. The material used for the lap should preferably be rigid but some degree of plastic flow can be accommodated except when high speed processing is involved, i.e. when using a polishing lap rotating at 1000 rpm or more, when it is necessary to use a rigid polishing lap. The choice of polishing lap material is not critical but a material must be chosen of suitable rigidity which is not damaged or decomposed by the liquids used in the polishing operation. Materials we have found satisfactory include pitch (hard or medium hard, in some cases with barium sulphate and wood flour filler), a foamed polyurethane lapping material supplied under the trade name "Colossus" by James Rhodes and Company, 1026 West Jackson Blvd., Chicago, Ill. 60607, and a finely grooved polyurethane material developed by Carl Zeiss, Oberkochen, W. Germany and supplied under the trade name "Polytron" by CMV Paris, 115 Rue de la Republic, 92800 Puteaux, France. We prefer in the case of the material sold under the trade name "Colossus" to use a grade denoted by the figures LP26 having a Shore Hardness of 30–40. "Polytron" has a Shore Hardness of about 80.

The feed of the treatment liquid and subsequently of the alkaline solution to the polishing lap, when processing lenses for optical purposes, may be through the centre of the lap but when carrying out the high speed processing of ophthalmic lens blanks the feed is preferably tangential to the lens blank from a fixed feed line. Care is also needed in the choice of lap for low speed working as with some materials an inexplicable orange peel surface feature is formed, but we find that this does not occur with hard pitch or Polytron.

The rate of flow of liquid should be sufficient to prevent overheating of the glass article which might otherwise result in breakage of the article. Also when carrying out high speed processing it is necessary to supply the liquid at a feed rate which will also prevent temperatures being reached at which organic components, such as sugar, if present in the liquid, will break down.

U.K. Patent Specification No. 747,759, referred to above, contains a discussion of the range of materials that can be used in the treatment liquid for surfacing a continuous ribbon of glass and examples of suitable formulations of the mixtures of materials needed to achieve success in the surfacing of flat glass. We have found that the general guidance provided as to choice of bifluoride, acid and suppressant is applicable to our method, which differs primarily in the introduction of the neutralisation step referred to above as opposed to the simple flooding by water suggested in the prior U.K. specifications discussed above.

As regards the choice of bifluoride, we prefer to use potassium bifluoride (KFHF). Other bifluorides which we have used include ammonium bifluoride or a mixture of potassium and ammonium bifluorides. The concentration of bifluoride used in the treatment liquid is related to the rate of reaction required with the glass surface so as to obtain a good finish in a time interval that is shorter than that required in conventional processing. It is important therefore to follow the teaching of U.K. Specification No. 747,759 that the treatment liquid should have a fairly high bifluoride concentration and a fairly low solubility for the fluorides or silicofluorides reaction products. The bifluoride solutions used should therefore be virtually saturated solutions.

The choice of the acid to supply hydrogen ions, whose purpose is to ensure in turn the production of the desired fluoride ions which attack the glass surface, is primarily limited by the need to choose an acid in which the solubility of the silicofluoride or fluoride formed by reaction with the glass surface is not so high as to prevent satisfactory separation of the silicofluoride or fluoride on the glass surface. Acids we have found satisfactory include from among the organic acids, acetic acid, and from among the inorganic acids, hydrochloric acid and phosphoric acid.

With some glasses we have found that a characteristic incompletely polished appearance called "Greyness" is obtained. In those circumstances we have found it possible to obtain a satisfactory finish by the addition of an oxidising agent, chosen from the group consisting of nitric acid, chromic acid and hydrogen peroxide. The mechanism by which a good finish is obtained through use of one of these materials in addition to the components recommended in U.K. specification No. 747,759 is not understood by us, but it is possible that the presence of the additional component assists in ensuring uniform depth of attack on the surface being treated. Thus in those cases where the glass reacts to give a silicofluoride and/or fluoride and this is associated with the production of greyness, some trial is needed to determine the optimum quantity of e.g. nitric acid to achieve a satisfactory finish. It has not been possible to correlate the occurrence of this problem with one particular component in the glasses in which greyness occurs, but it is very noticeable in the glasses treated in Examples IV and V, described below.

We have also found that while the method is applicable to all glasses which have a composition such that in the presence of a bifluoride, an insoluble silicofluoride or fluoride is formed, there are certain glasses where, even when using nitric acid in the mixture, the rate of attack and formation of a masking film is such that the process shows no real advantage over known methods. It is feasible but not our recommended practice, to use a more severe oxidising agent such as chromic acid. Processing can then be achieved in a reasonable time scale. The use of chromic acid should only be undertaken under very carefully controlled and supervised circumstances. The glass sold under the designation BSC 517642 by Chance-Pilkington Limited, falls into this category.

U.K. Patent Specification No. 747,759 contains at page 5, lines 56 to 110, a list of suitable solubility suppressants. Suppressants are used to depress the solubility of the fluoride or silicofluoride salts produced by the reaction of the fluoride ions with the glass surface being treated, so as to ensure the separation of these reaction products on the surface. Where potassium bifluoride is used in the treatment liquid, some of the water used can be replaced by a solvent of lower solvent power for the potassium silicofluorides. Such solvents which thus act as suppressants include acetic acid, formic acid and phosphoric acid. We have found phosphoric acid in particular is satisfactory for this purpose. As stated in U.K. Specification No. 747,759, a very suitable solid suppressant is the commonly available domestic sugar i.e. sucrose. This material is readily available and we have found it convenient to use it. The quantity required to control the silicofluoride solubility and ensure separation on the glass surface may be found by experiment as it will vary with the processing conditions and materials used. For example, when operating at the temperatures which are reached during high speed processing of ophthalmic lenses, the quantity required will be greater than when polishing optical elements at relatively low speeds with what is otherwise the same liquid.

We have also found that it is essential for the treatment liquid applied during the polishing operation to contain inert particles, e.g. of barium sulphate, to prevent direct contact between the polishing lap and the glass surface. Other inert materials, i.e. materials which are substantially inert to the particular materials used in the process, that can be used include cerium oxide, zirconium oxide, chromium oxide and tin oxide. Such inert particles should also be added to the alkaline solution used to neutralise the treatment liquid at the end of the polishing operation. Alternatively a suspension of precipitated calcium carbonate, which is only slightly soluble in water, may be used as the neutralising solution, in which case added inert particles are not needed as the undissolved particles of calcium carbonate can serve as the inert particles. The particle size chosen should be the size normally used in conventional glass surface polishing processes, i.e. a diameter of the order of 10 microns or less. If too large a diameter is chosen degradation of the glass surface will occur, due to sleeks (i.e. very fine marks or scratches).

The quantity of inert material used in the treatment liquid is influenced by the quality of surface finish desired. We find that as much as 30% inert material by weight to volume of the treatment liquid (e.g. to 100 cc one would add 30 grams) may be used when processing ophthalmic lens blanks at high speeds, reduced to about 10% by weight to volume when finishing precision optical components. In general we find it unsatisfactory to operate with below 10% inert material wt/vol of the treatment liquid. As regards the neutralising liquid, as long as at least 2% of the inert material by weight to volume is present, contact between the glass surface and the lap is avoided.

A range of alkaline solutions could be used to neutralise the treatment liquid at the end of the polishing process, but care is needed in choosing the alkali so that the nature of the alkali and the concentration of it are such that the glass and the lap are not damaged. For example, strong caustic soda solutions would attack a pitch lap and many types of glass. It is important that there should be an immediate change-over so that the feed of treatment liquid used to polish the glass article is stopped and replaced at once by alkaline solution so that there is a continued feed of liquid. It is not possible to make a gradual change-over. We have used sodium carbonate solutions in concentrations as high as 150 gms/liter but one can operate with as low as 10 gms/liter. Attempts to omit the neutralisation step in any of our trials have resulted in an unsatisfactory glass surface, and in high speed work such as that illustrated in Examples VI and VII, described below, gross attack can be observed when this step is omitted.

An indicator which changes colour with change of pH can be included in the treatment liquid and/or the neutralising solution so that the completion of the neutralisation step is signalled by a change in colour. A suitable indicator is methyl red.

DETAILED DESCRIPTION OF THE INVENTION

Specific examples of processes according to the invention, illustrating the finishing of surfaces of articles of different types of glass, will now be described in more detail.

EXAMPLE I

A Dense Flint concavo-convex lens, 86 mm in diameter, was formed to a smooth ground state before polishing. Polishing such a lens to a final finish from this stage using a cerium oxide/water slurry would take at least 60 minutes per surface. The lens was polished by the method of the invention using a lap made from pitch of 1.6 mm Twyman indentation hardness, filled with 10% wt/wt wood flour and 30% wt/wt barium sulphate. The liquid applied to the polishing lap was made up as follows:

| | |
|---|---|
| $H_2O$ | 400 mls |
| HCl (37% conc) | 120 mls |
| KFHF | 270 gms |
| Sugar | 450 gms |

100 gms of barium sulphate having a particle size of less than 10 microns was added to each liter of the treatment liquid so as to form 10% wt/vol of the liquid. In 9 minutes using this lap and liquid one surface of the lens was finished to an acceptable optical quality. Assuming that the finish is satisfactory to the eye, the final measurement of the finish is based on the number of interference fringes formed between the finished lens and accurate test pieces when viewed in monochromatic (sodium D-line) light and once the end product is within 12 fringes i.e. there are 12 or less fringes formed, it is in practice acceptable. The lens in this case was within 7 fringes. Polishing was stopped by stopping the supply of treatment liquid to the lap and immediately supplying for one minute water containing anhydrous sodium carbonate in a concentration of 100 gms/liter, and cerium oxide having a particle size of less than 10 microns at 100 gms/liter. This neutralised the remaining treatment liquid applied during polishing and ensured a blemish-free surface on the lens.

The actual glass composition was in weight %:

| | |
|---|---|
| $SiO_2$ | 44.96 |
| $Na_2O$ | 2.52 |
| $K_2O$ | 6.29 |
| PbO | 45.86 |
| $As_2O_3$ | 0.20 |
| $Sb_2O_3$ | 0.20 | and weight measurements showed that glass was removed from the lens during polishing at about 1 μm per minute.

This example was repeated in order to investigate the effect of a reduction in the quantity of sodium carbonate and cerium oxide present in the neutralising liquid fed to stop the polishing action. The example was carried out exactly as before except that the treatment liquid was replaced by water containing anhydrous sodium carbonate in a concentration of 10 gms/liter and cerium oxide 20 gms/liter. No adverse effect was observed.

EXAMPLE II

An extra dense flint glass plano-concave lens 70 mm in diameter was finished to a smooth-ground state suitable for polishing. It was then polished using the same liquids as in Example I, except that the amount of barium sulphate added was 20%. The polishing lap was a finely grooved polyurethane sold under the trade name "Polytron" by CMV Paris. Polishing to an acceptable quality took 5 minutes per surface compared with at least 40 minutes per surface when polishing is carried out in a conventional manner using the same polishing lap and a cerium oxide slurry as abrasive. The final neutralisation step was carried out in the same manner as Example I, but using a concentration of sodium carbonate of 20 gms/liter, with 100 gms/liter cerium oxide.

The glass composition used was in weight % as follows:

| | |
|---|---|
| $SiO_2$ | 37.19 |
| $Na_2O$ | 1.71 |
| $K_2O$ | 4.62 |
| CaO | 0.1 |
| PbO | 51.96 |
| $Al_2O_3$ | 0.2 |
| $TiO_2$ | 3.71 |
| $As_2O_3$ | 0.40 |

EXAMPLE III

A double Extra Dense Flint plano-concave glass lens of 70 mm diameter was finished to a smooth ground state suitable for a final polish. This final finish or polish was carried out using a hard pitch lap (1.4 mm Twyman indentation hardness) using a liquid of the following composition:

| | |
|---|---|
| 200 mls | $H_2O$ |
| 200 gms | KFHF |
| 100 gms | sugar |
| 160 mls | $CH_3COOH$ (glacial) |
| 100 mls | $H_3PO_4$ (85% conc) |

The liquid contained in addition 20% wt to volume barium sulphate. The time to reach an acceptable optical finish was 10 minutes per surface, followed by a 1 minute wash with a neutralising solution containing 100 gms/liter sodium carbonate and 100 gms/liter cerium oxide as in Example I. A conventional polishing technique would take at least 3 hours per surface.

The composition of the glass being finished was in weight %:

| | |
|---|---|
| $SiO_2$ | 30.70 |
| $K_2O$ | 3.56 |
| PbO | 65.54 |
| $Sb_2O_3$ | 0.2 |

EXAMPLE IV

A flat disc 75 mm in diameter made of a Medium Barium Crown glass which has been brought to a smooth ground state was polished using a lap made of the same polyurethane material as Example II. The treatment liquid used was the same as that employed in Example III, except that due to the occurrence of "greyness" it was found necessary to add concentrated nitric acid to the liquid. The quantity of nitric acid was such that 91.5% by volume of the liquid used was as in Example III and the remainder nitric acid. Barium sulphate was added to the mixture at 20% wt. to volume. The neutralising treatment was carried out for 1 minute using the same sodium carbonate/cerium oxide mixture as in the previous example. The time taken to achieve a satisfactory finish of optical quality was 15 minutes per face as compared to at least 40 minutes in conventional finishing. The glass treated was of the following composition in weight %:

| | |
|---|---|
| $SiO_2$ | 46.17 |
| $B_2O_3$ | 10.01 |
| $Na_2O$ | 3.26 |
| $K_2O$ | 4.10 |
| BaO | 23.48 |
| PbO | 1.5 |
| ZnO | 9.99 |
| $Al_2O_3$ | 0.46 |
| $As_2O_3$ | 0.55 |
| $Sb_2O_3$ | 0.5 |

EXAMPLE V

A Dense Barium Crown plano-convex lens, 80 mm in diameter, was finished to a smooth ground state suitable for final polishing. This polishing was carried out using a hard pitch lap (pitch of 2.0 mm Twyman hardness, filled with 30% wt/wt barium sulphate). It was found necessary to add nitric acid to the treatment liquid which was of the same composition as that used in Example I. The quantity of nitric acid was such that the liquid applied to the surface contained 88% of the liquid of Example I, and the remainder was nitric acid. Barium sulphate was then added at 30% wt to volume. Each surface was finished to an acceptable optical finish in 15 minutes per surface compared with 120 mins per surface in conventional processing. The neutralisation step was carried out in the same way as in Examples III and IV. The glass composition used was in weight %:

| | |
|---|---|
| SiO$_2$ | 29.54 |
| B$_2$O$_3$ | 18.07 |
| CaO | 2.57 |
| BaO | 41.44 |
| Al$_2$O$_3$ | 3.18 |
| ZrO$_2$ | 5.0 |
| As$_2$O$_3$ | 0.2 |

EXAMPLE VI

An ophthalmic lens blank of white glass 65 mm diameter of power (+6−6) was polished on a high speed ophthalmic polishing machine using a foamed polyurethane lap and 2 atmospheres applied pressure at 2800 rpm. The treatment liquid used was the same as that used in Example I with 30% wt to volume added barium sulphate and additional sugar amounting to 150 gms/liter. The additional sugar was to prevent the silicofluorides or fluorides dissolving in the mixture as the temperature increased due to the high speed processing. The liquid was used at a flow rate of 70 mls/minute and at this flow rate each surface was finished to a normal ophthalmic standard in 20 seconds. Each surface was then treated for 5 seconds with the same neutralising solution containing sodium carbonate and cerium oxide as in Examples III, IV and V, fed at 500 mls/min. The total finishing time of 25 seconds compared with a conventional polishing time of 120 seconds. The glass used had the following composition in weight %:

| | |
|---|---|
| SiO$_2$ | 61.60 |
| B$_2$O$_3$ | 3.88 |
| K$_2$O | 13.14 |
| CaO | 6.69 |
| ZnO | 3.30 |
| Al$_2$O$_3$ | 6.55 |
| ZrO$_2$ | 3.80 |
| TiO$_2$ | 0.50 |
| As$_2$O$_3$ | 0.40 |

EXAMPLE VII

A similar spectacle lens blank to that treated in Example VI was polished at 2800 rpm on the same machine. The glass was of a photochromic composition and the pressure was 1½ atmospheres. The treatment liquid used was of the same composition as Example VI but was fed at 120 mls/minute. The neutralising treatment employed the same solution and was carried out for the same time and in the same manner as in Example VI. Each surface was completed in 20 seconds in comparison with a conventional processing time of 120 seconds.

The base glass composition apart from photochromic additives was in weight %:

| | |
|---|---|
| SiO$_2$ | 17.1 |
| B$_2$O$_3$ | 14.0 |
| K$_2$O | 10.9 |
| CaO | 3.3 |
| BaO | 8.8 |
| Al$_2$O$_3$ | 28.0 |
| ZrO$_2$ | 0.9 |
| P$_2$O$_5$ | 14.8 |

| -continued | |
|---|---|
| Li$_2$O | 1.4 |

EXAMPLE VIII

A flat disc of Hard Crown glass, 110 mm in diameter was brought to a smooth ground condition. It was then polished on a medium hard pitch lap (3 mm Twyman indentation hardness), supplied with a treatment liquid of the same composition as that of Example III except that barium sulphate was added to the extent of 30% by weight to volume. At the end of polishing, the liquid on the lap was immediately replaced by a neutralising liquid containing 100 gms sodium carbonate and 100 gms cerium oxide per liter of water for 1 minute. Each surface was finished in 10 minutes to an acceptable optical finish and flatness, compared with 4 hours by conventional processing.

The glass composition in weight % was:

| | |
|---|---|
| SiO$_2$ | 69.7 |
| B$_2$O$_3$ | 0.6 |
| Al$_2$O$_3$ | 0.76 |
| Na$_2$O | 10.9 |
| K$_2$O | 5.1 |
| CaO | 9.5 |
| MgO | 1.0 |
| BaO | 2.0 |
| TiO$_2$ | 0.02 |

EXAMPLE IX

A set of 8 discs, each of 50 mm diameter, of the same Hard Crown glass as in Example VIII, was mounted on a metal plate and the surfaces brought to a smooth ground condition. This set of discs was polished on a pitch lap supplied with the same treatment liquid as in Example III except that barium sulphate was added to the extent of 20% by weight to vol. At the end of polishing, the liquid was immediately replaced with a neutralising liquid containing 100 gms of sodium carbonate and 100 gms cerium oxide per liter of water for one minute.

The surfaces of one side of the set of eight discs were polished to an optical finish and to a satisfactory degree of flatness in 15 minutes, compared with 4 hours by conventional processing.

EXAMPLE X

A flat disc of 86 mm diameter of lead-containing X-ray protection glass was polished direct from the cutting stage i.e. without smooth-grinding. It was polished on a POLYTRON lap supplied with treatment liquid of the composition of Example I. After polishing, the liquid on the lap was immediately replaced with a neutralising liquid containing 100 gms sodium carbonate and 100 gms cerium oxide per liter of water.

The disc was polished to an acceptable optical finish and an adequate flat figure in 20 minutes.

Weight measurements showed the depth of glass removal to be approximately 100 μm.

The glass composition in weight % was:

| | |
|---|---|
| SiO$_2$ | 25.9 |
| CaO | 1.0 |
| BaO | 15.9 |
| Al$_2$O$_3$ | 3.6 |

-continued

| | |
|---|---|
| PbO | 53.2 |
| As$_2$O$_3$ | 0.2 |
| Sb$_2$O$_3$ | 0.2 |

In all of the foregoing Examples, the neutralising step was followed by final washing of the article to remove the neutralised liquid and any remaining alkaline solution, after which the article was found to have a blemish-free surface.

We claim:

1. In a method of finishing a surface of a glass article to a close tolerance and a substantially blemish-free state, comprising the steps of causing a polishing lap to act on the surface by relative movement while continuously supplying to the surface a treatment liquid comprising water, inert particles which exert an abrasive action while preventing direct contact between the polishing lap and the glass surface, a bifluoride which forms an at least partially insoluble silicofluoride or fluoride by reaction with the glass surface, an acid which supplies hydrogen ions in solution in the water, and a solubility suppressant which maintains the treatment liquid in such a state that the silicofluoride or fluoride separates out and continues to separate out on the glass surface, whereby the lap and inert particles remove the silicofluoride or fluoride from high portions of the surface and thereby allow further reaction and glass removal in those areas, and continuing the relative movement of the polishing lap and the supply of treatment liquid until a desired finished form of the glass surface has been achieved, the improvement which resides in continuing the relative movement of the polishing lap while stopping the supply of treatment liquid and replacing it immediately by a supply of an alkaline solution which neutralises any treatment liquid remaining on the glass surface or on the lap and which contains inert particles which continue the prevention of direct contact between the polishing lap and the glass surface, and finally washing the surface to remove the alkaline solution and any remaining neutralised treatment liquid.

2. A method according to claim 1 for finishing a surface of an optical lens, wherein the treatment liquid and subsequently the alkaline solution are supplied through the center of the polishing lap.

3. A method according to claim 1 for finishing a surface of an ophthalmic lens blank using a polishing lap rotating at 1000 rpm or more, wherein the treatment liquid and subsequently the alkaline solution are supplied tangentially to the lens blank from a fixed feed line.

4. A method according to claim 1 wherein the inert particles in the treatment liquid and in the neutralising solution are of a material selected from the group consisting of barium sulphate, cerium oxide, zirconium oxide, chromium oxide and tin oxide.

5. A method according to claim 1 wherein the inert particles in the neutralising solution are of precipitated calcium carbonate.

6. A method according to claim 1 wherein the neutralising liquid contains at least 2% of inert material by weight to volume.

7. A method according to claim 1 wherein the neutralising solution is a solution of sodium carbonate with a concentration of from 10 to 150 gm/liter.

8. A method according to claim 1 wherein an indicator which changes colour with changes in pH value is included in the treatment liquid and/or the neutralising solution.

9. A method according to claim 8 wherein the indicator is methyl red.

* * * * *